United States Patent [19]

Sechrist et al.

[11] Patent Number: 4,859,643
[45] Date of Patent: Aug. 22, 1989

[54] REGENERATION METHOD WITH REDUCED CATALYST HEAT EXPOSURE

[75] Inventors: Paul A. Sechrist, Arlington Heights; WIlliam J. Koves, Hoffman Estates, both of Ill.

[73] Assignee: UOP, Des Plaines, Ill.

[21] Appl. No.: 192,800

[22] Filed: May 11, 1988

[51] Int. Cl.[4] .................. B01J 38/44; B01J 38/24; B01J 23/96; C10G 35/12
[52] U.S. Cl. ...................... 502/37; 208/140; 208/165; 208/173; 502/35; 502/47; 502/48
[58] Field of Search ............ 502/48, 49, 45–47, 502/52, 37, 35; 208/165–175, 140

[56] References Cited

U.S. PATENT DOCUMENTS

| | | | |
|---|---|---|---|
| 2,534,859 | 12/1950 | Evans | 208/169 |
| 2,671,057 | 3/1954 | McClure | 252/418 |
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 3,716,969 | 2/1973 | Maeda | 55/390 |
| 3,745,112 | 7/1973 | Rausch | 208/139 |
| 3,838,038 | 9/1974 | Greenwood et al. | 208/108 |
| 3,978,150 | 8/1976 | McWilliams, Jr. | 260/683.3 |
| 4,333,751 | 6/1982 | Iwamura et al. | 55/390 |
| 4,349,362 | 9/1982 | Tanaka et al. | 55/390 |
| 4,438,288 | 3/1984 | Imai et al. | 585/379 |
| 4,506,032 | 3/1985 | Imai et al. | 502/223 |
| 4,647,549 | 3/1987 | Greenwood | 502/48 |
| 4,724,271 | 2/1988 | Matindale | 502/47 |

Primary Examiner—Paul E. Konopka
Attorney, Agent, or Firm—Thomas K. McBride; John G. Tolomei

[57] ABSTRACT

A method for regenerating coke-contaminated catalyst particles achieves better utilization of oxygen and minimizes surface area loss of the catalyst by confining particles in the combustion section of a regeneration zone to a tapered bed configuration. In this method, catalyst particles move through the regeneration zone in continuous or semi-continuous flow and are formed into a vertically elongated bed of particles in the regeneration zone. An oxygen-containing gas is passed through the particle bed in a transverse direction and initiates combustion of the coke deposits along a burn front that extends diagonally through the catalyst bed from the inlet surface of the bed to the outlet surface of the bed. The catalyst bed is tapered to reduce the volume of catalyst particles behind the burn wave, with respect to gas flow through the bed, thereby increasing the gas flow through the upper portion of the bed and removing catalyst that would be exposed to high temperature flue gas flowing across the bed from the burn front. The method of this invention can confine catalyst particles to a bed having a continuous taper or the thickness of the bed may be varied by confining the catalyst in discrete bed portions that increase progressively down the length of the bed. This method of regeneration can also include steps for halogenation and drying of the catalyst particles. A particularly useful application of this invention is in reforming processes.

20 Claims, 6 Drawing Sheets

REGENERATION METHOD WITH REDUCED CATALYST HEAT EXPOSURE

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BACKGROUND OF THE INVENTION

Catalytic processes for the conversion of hydrocarbons are well known and extensively used. Invariably the catalysts used in these processes become deactivated for one or more reasons. Where the accumulation of coke deposits causes the deactivation, reconditioning of the catalyst to remove coke deposits restores the activity of the catalyst. Coke is normally removed from catalyst by contact of the coke containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In continuous or semi-continuous regeneration process, coke laden particles are at least periodically added and withdrawn from a bed of catalyst in which the coke is combusted. In those processes having an essentially linear progression of catalyst particles through the bed and a transverse flow of oxidizing gas coke combustion, there are regions of intense burning that extend through portions of the catalyst bed.

These regions vary the oxygen demands down the length of the bed so that a uniform gas addition across a surface of the bed will not provide the most effective utilization of the oxygen-containing gas. Inefficient utilization of the oxygen-containing gas raises overall gas demands which wastes equipment and energy. One of the ways in which gas is wasted is by variations in the oxygen demand that can permit oxygen to break through the catalyst bed. Therefore it would be generally desirable to direct the oxygen-containing gas to areas where it can be most effectively used to burn coke from the catalyst.

Another problem associated with localized regions of intense coke combustion is catalyst deactivation. Exposure of high surface area catalyst to high temperatures for prolonged periods of time will create a more amorphous material having a reduced surface area which in turn lowers the activity of the catalyst until it reaches a level where it is considered deactivated. Deactivation of this type is permanent, thereby rendering the catalyst unusable. When moisture is present—water is a by-product of the coke combustion—the deactivating effects of high temperature exposure are compounded.

The combination of temperature, water vapor, and exposure time determine useful life of the catalyst. The burning of coke in localized portions of a catalyst bed has the deleterious effect of heating gases and generating moisture that pass through downstream portions of the bed and extend the high temperature exposure time of catalyst particles in the bed.

INFORMATION DISCLOSURE

U.S. Pat. No. 3,652,231 (Greenwood et al.) shows regeneration apparatus in which a constant-width movable bed of catalyst is utilized. '231 also describes a continuous catalyst regeneration process which is used in conjunction with catalytic reforming of hydrocarbons. U.S. Pat. Nos. 3,647,680 (Greenwood et al.) and 3,692,496 (Greenwood et al.) also deal with regeneration of reforming catalyst. These patents ('231, '680, and '496) are hereby incorporated in full into this patent application.

U.S. Pat. No. 3,838,038 lists exemplary hydrocarbon conversion processes with which moving bed regeneration apparatus may be used (column 6); the list includes hydrocracking and other hydroprocessing applications, isomerization, alkylation, and dehydrogenation.

In U.S. Pat. No. 3,978,150 (McWilliams), which discloses a process for catalytic dehydrogenation of saturated normal paraffins, especially those having two to six carbon atoms per molecule, a catalyst which may be regenerated in apparatus designed in accordance with '231 is used, though the halogenation section is not required (see column 7). Additional examples of dehydrogenation catalysts which may be regenerated using the apparatus of the present invention may be seen in U.S. Pat. Nos. 4,438,288 (Imai et al.) and 4,506,032 (Imai et al.).

U.S. Pat. No. 3,745,112 (Rausch) discloses a catalyst of broad utility which is preferably regenerated by means of a moving bed process which may be practiced in apparatus of the present invention.

U.S. Pat. No. 2,671,057 (McClure) depicts a catalyst bed that rests at its angle of repose across partitions or along a vessel wall to taper the surface of a catalyst bed used in a hydrocarbon conversion or regeneration process.

U.S. Pat. Nos. 3,716,969 (Maeda), 4,349,362 (Tanaka) and 4,333,751 (Iwamura) depict apparatus for moving bed adsorption processes that use adsorbent beds having a greater thickness at the bottom than at the top.

BRIEF SUMMARY OF THE INVENTION

The present invention is a method for reducing catalyst deactivation and increasing the utilization of oxygen in a regeneration process that contacts a moving bed of catalyst with an oxygen-containing regeneration gas and maintains a vertically extending burn zone through the bed of catalyst. The catalyst bed has a small width to length ratio. The catalyst particles pass down the length of the bed. The oxygen-containing regeneration gas passes transversely through the bed. The upper portion of the burn zone is in the form of a wave front that starts at the end of the bed where coke-containing catalyst particles are added and an inlet surface where the transversely flowing gas first enters the bed. The wave front progresses down at least a portion of the bed length and slopes away from the inlet surface. Catalyst deactivation is diminished by reducing the duration or the temperature of the gases to which the catalyst particles behind the burn wave are exposed. The term "behind the burn wave" refers to the volume of catalyst particles located downstream, with respect to transverse gas flow through the bed, of the wave front. Oxygen utilization is enhanced by increasing the volume of gas passing through the upper portions of the burn zone relative to the lower portions. Increasing the gas flow through the catalyst particles located behind the burn wave provides more gas that can act as a heat sink to absorb the total release of heat by the combustion of coke. Therefore the temperature of the gas behind the wave front is reduced relative to the temperature produced by the gas flowing at a lower rate. The volume of catalyst behind the burn zone can also be reduced by varying the thickness of the bed. Since the burn wave slopes away from the inlet face, using straight sides on the catalyst bed leaves an inverted frusto-conical volume of catalyst particles behind the burn wave. Varying the thickness of the bed along its axis removes a portion of the particles from this frusto-conical volume. By making the upper portion of the bed narrower relative to the lower portion, a reduced amount of catalyst particles are present for hot gases to pass through. At the lower end of the burn wave, catalyst particles located in front of the wave front are only exposed to the relatively cool temperature of the oxygen-containing gas as it enters the burn zone, therefore, an increased bed thickness in this region does not promote deactivation. In addition, the thinner section of bed at the beginning portion of the wave front allows a higher gas velocity through that portion of the particle bed so that more oxygen is available for utilization where catalyst first enters the bed and oxygen demands are the greatest. Thus, the confinement of catalyst particles according to the method of this invention also provides better utilization of the oxygen-containing gas in the method of regeneration. In fact, for the same average gas flux, a tapered bed has less total pressure drop than a uniform thickness bed of equivalent volume.

Accordingly, it is an object of this invention to reduce catalyst deactivation during a regeneration process.

It is a further object of this invention to increase the utilization of oxygen-containing gas in a regeneration zone.

It is a yet further object of this invention to effect capital and operating costs savings in the regeneration of hydrocarbon conversion catalyst by increasing oxygen utilization and reducing pressure drops.

In one embodiment, this invention is a method for removing coke from catalyst particles in a regeneration zone through which the particles move in at least semi-continuous flow. In this method, catalyst particles containing coke are passed into a regeneration zone and formed into a vertically elongated bed of particles. At least periodically, the particles move down the bed by withdrawing particles from the bottom of the bed and adding particles to the top of the bed. An oxygen-containing gas is introduced into a combustion section of the regeneration zone which extends across an inlet face of the catalyst bed. The oxygen-containing gas passes through the bed in a direction that is generally transverse to the direction of catalyst flow and initiates combustion of the coke deposits along a wave front that extends vertically through the combustion section. The wave front has an uppermost point that starts at the inlet face and extends down the catalyst bed and away from the inlet face. As combustion occurs, a flue gas comprising combustion products is collected and removed from the process. The duration of travel for the flue gas through catalyst particles located behind the wave front is decreased in order to reduce the exposure of these catalyst particles to high temperature gases.

Specific advantages can be obtained from other aspects and more specific method steps of this invention. In one step, the volume of the bed behind the burn zone is restricted by providing a tapered catalyst bed to remove catalyst from behind the wave front and reduce the duration of gas travel through particles behind the wave front. Providing a variable width will increase the allowable rate of coke burning thereby increasing the regeneration capacity in comparison to an equivalently sized unit having a constant bed width. Since only a modification to the bed arrangement is required, this increase in regeneration capacity is obtained at a relatively low cost.

Another arrangement of this invention extends the catalyst bed into a halogenation zone for further treatment of the catalyst. It can also be advantageous to continue confining the catalyst in a tapered form through the halogenation zone. With either arrangement, the thickness of the bed in the halogenation zone will be greater than the thickness utilized when a non-tapered bed is employed. This results in an increased catalyst residence time in the halogenation zone which is advantageous as catalyst residence time in the halogenation zone is sometimes a constraint on the catalyst circulation rate.

Additional aspects, embodiments, advantages and details of this invention are disclosed in the following detailed description.

DETAILED DESCRIPTION OF THE INVENTION

The present invention is applicable to a number of hydrocarbon conversion processes which utilize a catalyst. For example, it is useful in the isomerization of normal butane to isobutane and the isomerization of mixed $C_8$ aromatics, including those of high ethylbenzene content, to meta-xylene or para-xylene. The present invention may also be used in upgrading light straight run naphtha, which is a mixture rich in $C_5$ and $C_6$ paraffins (pentanes and hexanes), to the corresponding branched isomers, which have higher octane numbers than the feed naphtha. Another hydrocarbon conversion process in which the present invention may be used is dehydrogenation of light paraffins ($C_2$–$C_5$, but primarily $C_3$ and $C_4$) to the corresponding olefins.

However, the most widely practiced hydrocarbon conversion process to which the present invention is applicable is catalytic reforming. Therefore the discussion of the invention contained herein will be in reference to its application to a catalytic reforming reaction system. It is not intended that such discussion limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. Alumina is a commonly used carrier. The halogen is normally chlorine. The particles are usually spheroidal and have a diameter of from about 1/16th to about ⅛th inch (1.5–3.1 mm), though they may be as large as ¼th inch (6.55 mm). In a particular regenerator, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reformer will employ a moving bed reaction zone and regeneration zone. The present invention is applicable to a moving bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a multi-step process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

When using the method of this invention in a continuous or semi-continuous catalyst regeneration process, catalyst is contacted with a hot oxygen-containing gas stream containing gas stream (known in reforming processes as recycle gas) in order to remove coke which accumulates on surfaces of the catalyst while it is in a hydrocarbon conversion reaction zone. Coke is comprised primarily of carbon but is also comprised of a relatively small quantity of hydrogen. The mechanism of coke removal is oxidation to carbon monoxide, carbon dioxide, and water. Coke content of spent catalyst may be as much as 20% of the catalyst weight, but 5–7% is a more typical amount. After passing through a combustion zone, catalyst is usually passed into a drying zone for removal of water formed in the combustion zone which has remained on the catalyst instead of being carried off with combustion gases. Water removal is accomplished by passing a hot dry air stream through the catalyst. Catalyst is passed out of the regeneration vessel after combustion of coke and any required drying. The catalyst is usually subjected to additional treatment steps in order to complete the total regeneration process; an example of an additional step is contacting the catalyst with a gas comprised of hydrogen to effect reduction of metal catalyst components.

In order to dry catalyst in the regenerator, a dry air stream is introduced into the bottom of the regeneration vessel and flows upward, countercurrent to catalyst flow. After passing through the catalyst drying zone to accomplish removal of water, the air stream typically passes into a gas collection portion of the combustion zone, where it mixes with the gas produced by combustion and gases which have passed through the catalyst. This mixture, termed flue gas, is withdrawn from the combustion zone. Most regeneration process mix at least a portion of this gas with air and recycle it back to the combustion zone to contact the catalyst and combust coke. Usually, the portion which is not recycled is simply vented to atmosphere.

In regeneration vessels where catalyst flows through a combustion section in an elongated constant-width bed and recyle gas is passed horizontally through the bed, the quantity of oxygen provided to each point on the inlet surface of the bed remains constant. A typical oxygen concentration in gas supplied to a combustion section is about 1% by volume. Examples of this type of combustion section may be seen in U.S. Pat. No. 3,652,231 (Greenwood et al.), which has been incorporated into this document by reference thereto. The concentration of oxygen at every point on the outer boundary of a catalyst bed, which is defined by an outer screen, is the same. More oxygen is consumed in the upper regions of the moving constant-width bed than in the lower regions. In the upper portion of the bed, gas exiting the bed contains no oxygen while in the lower portion of the bed only a portion of the oxygen passing through the bed is consumed. As mentioned above, this is an undesirable situation.

The method of this invention provides more oxygen to the portion of the catalyst bed where it is needed (the upper portion) and less oxygen to the portion of the bed where coke burning takes place at a relatively slow rate (lower portion). This is accomplished by increasing the gas flow to the upper portion of the bed. One method of increasing gas flow is to vary the horizontal width of the bed, from a minimum width at the top of the combustion section to a maximum width at the bottom of the burn zone. This variation in bed width causes the flow of recycle gas through the bed to vary from a maximum at the top to a minimum at the bottom of the bed. Increased utilization of oxygen and the resulting increased rate of coke burning permits the rate at which catalyst is passed through the bed to be increased without changing the amount of coke remaining on the catalyst leaving the burn zone. The blower which provides recycle gas to the burn zone does not have to be increased in size in order to practice the invention and achieve a higher rate of coke removal.

Using this tapered configuration for the catalyst bed also results in a shorter catalyst residence time in the upper portion of the bed, where catalyst reaches a peak temperature. As previously explained, the surface area of commonly used hydrocarbon conversion catalysts decreases as the cumulative time during which the catalyst is exposed to hot gas increases. The effectiveness of the catalyst decreases as the surface area decreases. Thus, practice of the present invention will extend the total life of the catalyst.

Figure 1:
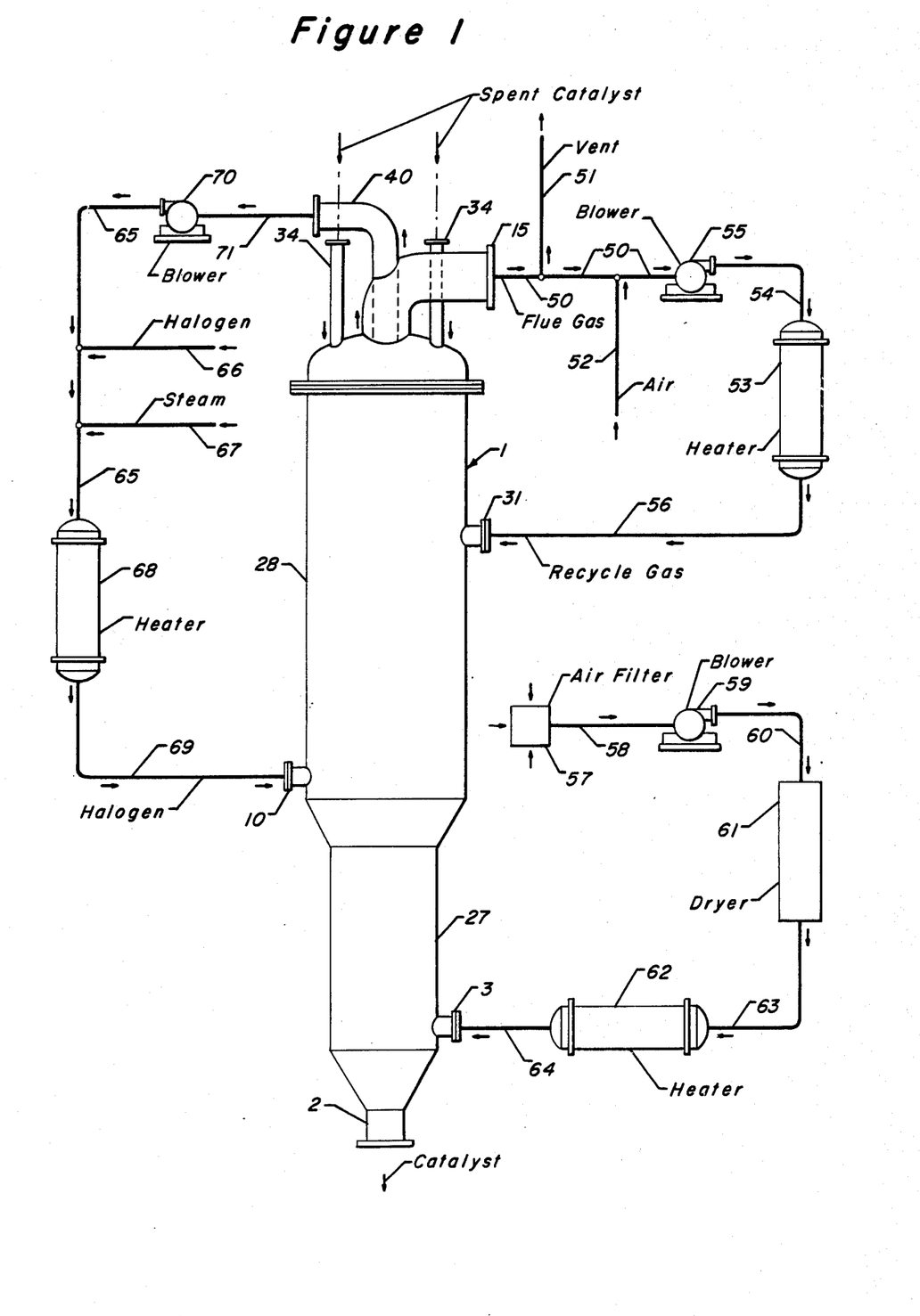
FIG. 1 is an arrangement for a regeneration process schematically showing the regeneration vessel and associated equipment.
Figures 2, 3:
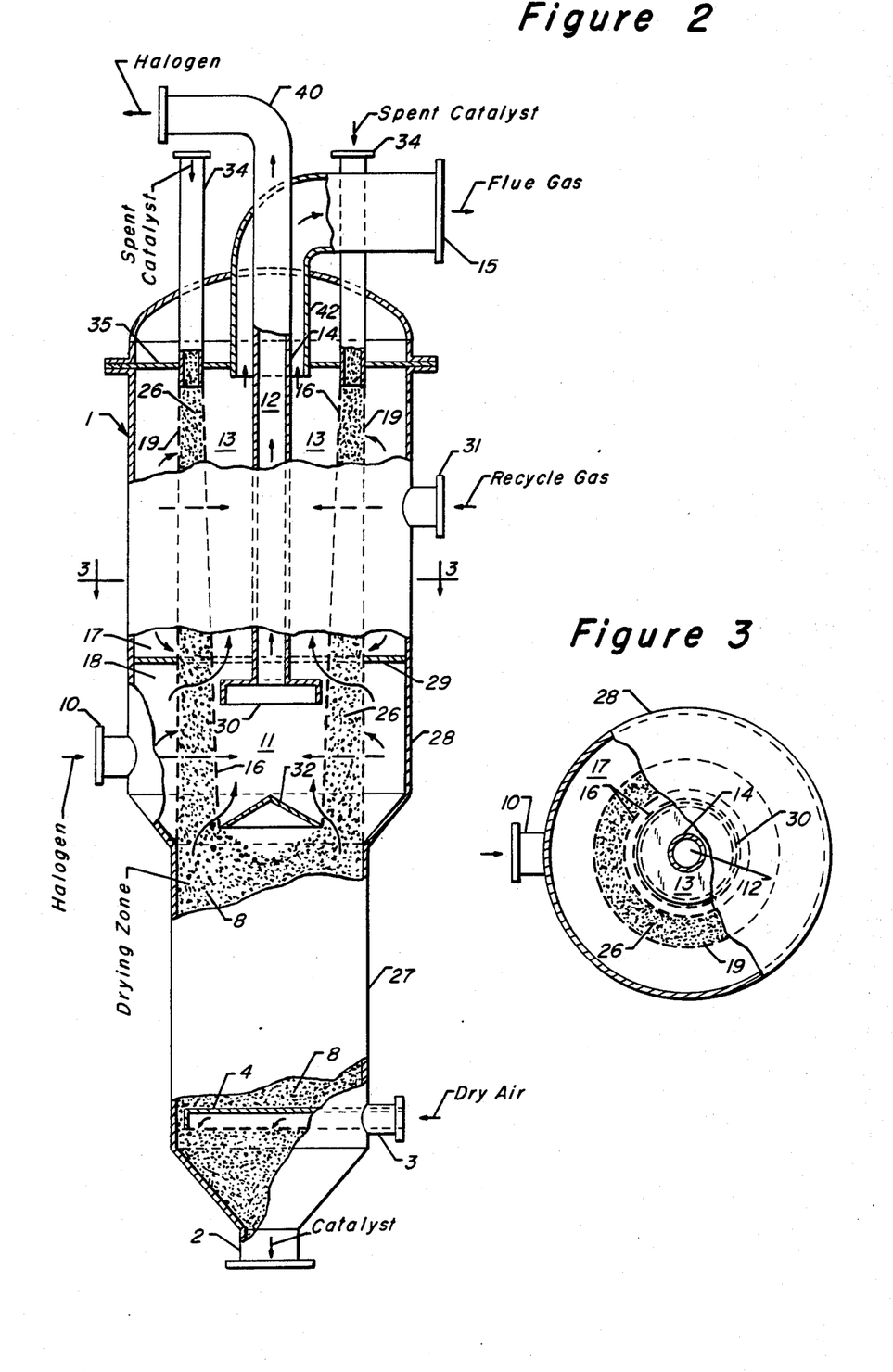
FIG. 2 is a cross-sectional elevation of the regeneration vessel of FIG. 1.
FIG. 3 is a transverse section of FIG. 2 taken at lines 3—3.

FIGS. 1–3 will now be utilized in describing a specific example of the invention; such use is not intended to limit the broad scope of the invention as presented in the claims. The Drawings show only elements and equipment which are essential to a clear understanding of the invention. Application and use of additional required items is well within the purview of one skilled in the art. U.S. Pat. Nos. 3,652,231, 3,647,680 and 3,692,496, which have been made a part of this document, may be consulted for additional detailed information.

Referring now to FIG. 1, spent catalyst particles are introduced into regeneration vessel 1 by means of nozzles 34. Catalyst is removed from regenerator 1 at the lower end through nozzle 2. Regenerator 1 has an upper section 28 and a lower section 27.

Flue gas leaves the upper section of the regeneration vessel through nozzle 15 and is conveyed to blower 55 by pipeline 50. A portion of the flue gas leaving the regenerator is vented from the system by pipeline 51. Air is added to the flue gas by pipeline 52. The gas stream may now be denoted "recycle gas". Recycle gas leaving blower 55 through pipeline 54 passes through heat exchanger 53 and pipeline 56 to enter the regenerator through nozzle 31. Heat exchanger 53 heats the recycle gas to carbon-burning temperatures.

FIG. 1 also depicts a halogenation loop. Reforming catalysts generally require a halogenation step as part of the regeneration process. A halogenation gas stream is provided to the halogenation section of the regenerator by nozzle 10. The halogenation gas exits the regenerator through nozzle 40 and is conveyed to heat exchanger 68 by pipelines 71 and 65 and by blower 70. Steam is added to the halogenation gas by means of pipeline 67. Makeup halogen is added through pipeline 66. After the halogenation gas is heated, it passes through pipeline 69 to regenerator upper section 28.

Air from the atmosphere is drawn through filter 57 and pipeline 58 by blower 59. The air stream passes from blower 59 through a pipeline 60 and into a dryer 61 for water removal before entering a heater 62 via a pipeline 63. The air stream is heated in heater 62 and passed into lower regenerator section 27 via pipeline 64 and nozzle 3.

Referring now to FIG. 2, outer and inner catalyst retention screens 16 and 19 extend vertically within the upper section 28 of regeneration vessel 1. Outer screen 19 is cylindrical in form. Inner screen 16, is tapered such that it has the sidewall shape of a hollow inverted frustum of a cone. The two catalyst retention screens have a central axis common with the central axis of the regeneration vessel. Screens 16 and 19 form a catalyst retention space through which a descending annular column of catalyst shown as bed 26, moves by gravity. Nozzles 34 deliver catalyst at points spaced around the annular bed. The catalyst screens have openings sufficiently small to preclude catalyst particles from passing through the screens. For a description of catalyst retention means, U.S. Pat. No. 3,652,231 may be consulted. The catalyst retention screens extend throughout the upper section of vessel 1 and deliver catalyst to the lower section 27 of regenerator 1.

The portion of the upper section of vessel 1 which is above a horizontal partition 29 is termed a combustion section. A space for distributing recycle gas around the catalyst bed is formed between screen 19 and the sidewall of regeneration vessel 1 in upper section 28 and is divided by partition 29. Partition 29 forms a barrier between a recycle gas distribution space 17 and a halogenation gas distribution space 18. Recycle gas enters the space 17 through recycle gas nozzle 31. A partition 35 provides a top closure for space 17. Recycle gas flows radially, or horizontally, from space 17 through bed 26 to a central space 13. A halogen conduit 14 occupies a portion of space 13. A lower boundary for central space 13 is provided by enlarged end 30 of conduit 14. Partition 35 constitutes a top closure for central space 13 as well as gas distribution space 17. Conduits 42 and 14 and the catalyst nozzles 34 pass through partition 35. Central space 13 is termed a flue gas collection space. Conduit 42 is an extension of nozzle 15 that communicate nozzle 15 with gas collection space 13. Conduit 14 extends from nozzle 40 and passes through collection space 13.

The portion of upper regenerator section 28 located below partition 29 is termed a halogenation section. A halogen-containing gas enters the zone via halogenation nozzle 10, flows into halogenation gas distribution space 18, and then flows through the catalyst in a radial manner before entering a halogenation collection space 11. A lower boundary of distribution space 18 is formed by a necked-down portion of the regenerator at the bottom of upper section 28. End closure 30 of conduit 14 forms the upper boundary and end closure 32 forms the lower boundary of collection space 11.

Screen 19 extends a short distance into the lower section 27 of vessel 1, which is of a smaller diameter than the upper section. The outside diameter of screen 19 is slightly smaller than the inside diameter of lower section 27. Catalyst discharged from bed 26 fills all of lower section 27 of vessel 1. Catalyst moves downward through the lower section of the vessel and out of the vessel through catalyst outlet nozzle 2.

Nozzle 3 on regeneration vessel 1 is equipped with means for distributing air, consisting of perforated pipe 4, to various points in a horizontal plane which is perpendicular to the descending catalyst. Pipe 4 distributes air uniformly up the column so that it contacts all of the catalyst forming a bed 8 in lower section 27, which provides a drying zone.

Air entering the vessel via pipe 4 has been dried so that it contains no more than about 5 parts per million (by volume) of water and has also been heated. The hot air passes upwardly through bed 8 removing moisture which is contained on the catalyst. Essentially all of the air moving up the column lower section passes into collection space 11. The air stream from the drying zone mixes with gas which has passed through the catalyst from distribution space 18 to collection space 11 and the combined stream enters halogen conduit 14 to flow out of the regeneration vessel via halogen nozzle 40. The vessel is designed so that substantially all of the gas in central space 11 enters conduit 14. By substantially it is meant that between 80 and 100% of the air from central space 11 enters conduit 14. In the embodiment of FIG. 2, this is accomplished by enlarged end 30.

FIG. 3 depicts the conduit and screen arrangements. Halogen conduit 14 having an interior 12 is centered on the vertical axis of the vessel. Catalyst retentions screens 16 and 19 enclose the downward moving bed of catalyst 26. The taper of bed 26 is depicted in FIG. 3 by the two dashed circles labelled with reference number 16. Gas in gas distribution space 17 flows radially through the catalyst to central space 13.

A portion of halogenation gas which passes through the bed in the halogenation zone enters central space 13, since the end portion 30 of conduit 14 is located below partition 29 (see FIG. 2). Gas passing through the catalyst in the burn zone provides the oxygen for combustion of carbon on catalyst in the burn zone and then mixes with the portion of upwardly flowing gas from the halogenation zone that did not enter conduit 14 and the mixture flows out of the vessel through nozzle 15.

Figure 7:
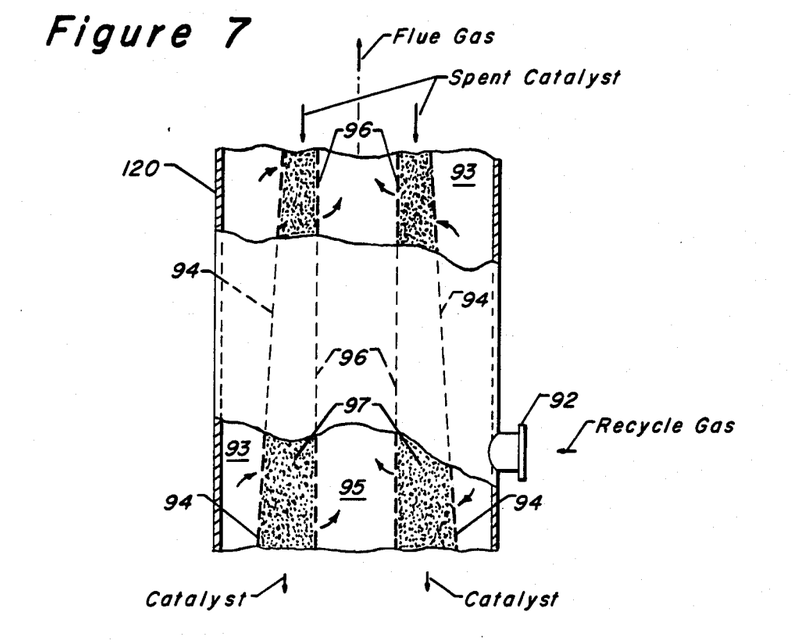
FIG. 7 is a cross-sectional view schematically showing an alternate arrangement for a catalyst bed of this invention.

It is not necessary in the practice of this invention to confine the catalyst to have a tapered inner bed surface or cylindrical profiles. FIG. 7 depicts a portion of a regenerator 120 in vertical section having the catalyst confined by retention screens 94 and 96 to provide a taper on the outer bed surfaces. Inner catalyst retention screen 96 is cylindrical while outer catalyst retention screen 94 has a frusto-conical shape. Gas entering through a nozzle 92, is distributed across outer surface 94 by a space 93 and passes into a gas collection space 95.

Figure 8:
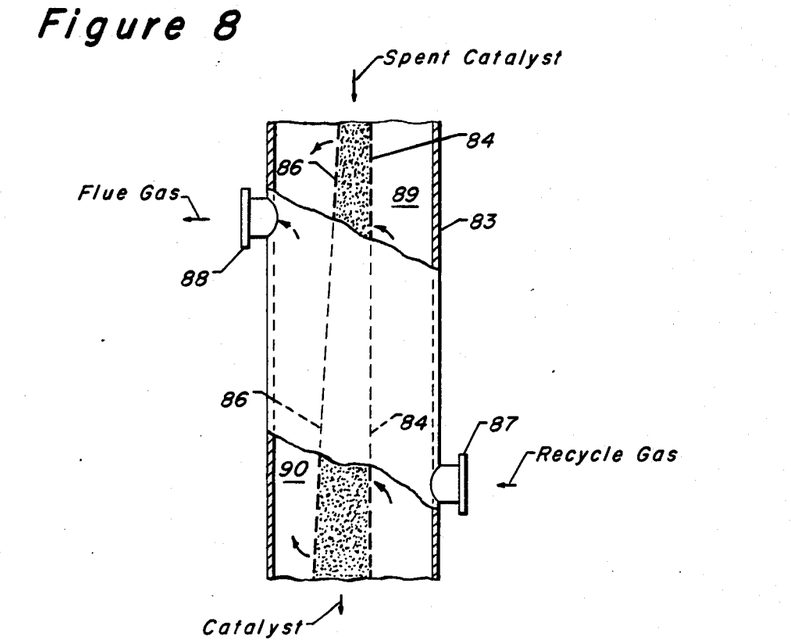
FIG. 8 is a cross-sectional view schematically showing another alternate arrangement for a catalyst bed of this invention.

FIG. 8 shows a portion of a regeneration vessel 83 in which catalyst is confined by a pair of flat retention screens 84 and 86 to provide a catalyst bed having flat inlet and outlet surfaces. Screen 86 is vertical while screen 84 is inclined to form a tapered bed. Recycle gas enters a gas distribution space 89 through a nozzle 87, passes through the catalyst bed, and enters a gas collection space 90 from which flue gas exits the regenerator through nozzle 88. Except for the different retention screens arrangements, regenerators 120 and 83 operate in the same manner as the regenerator of FIG. 2.

Figure 4:
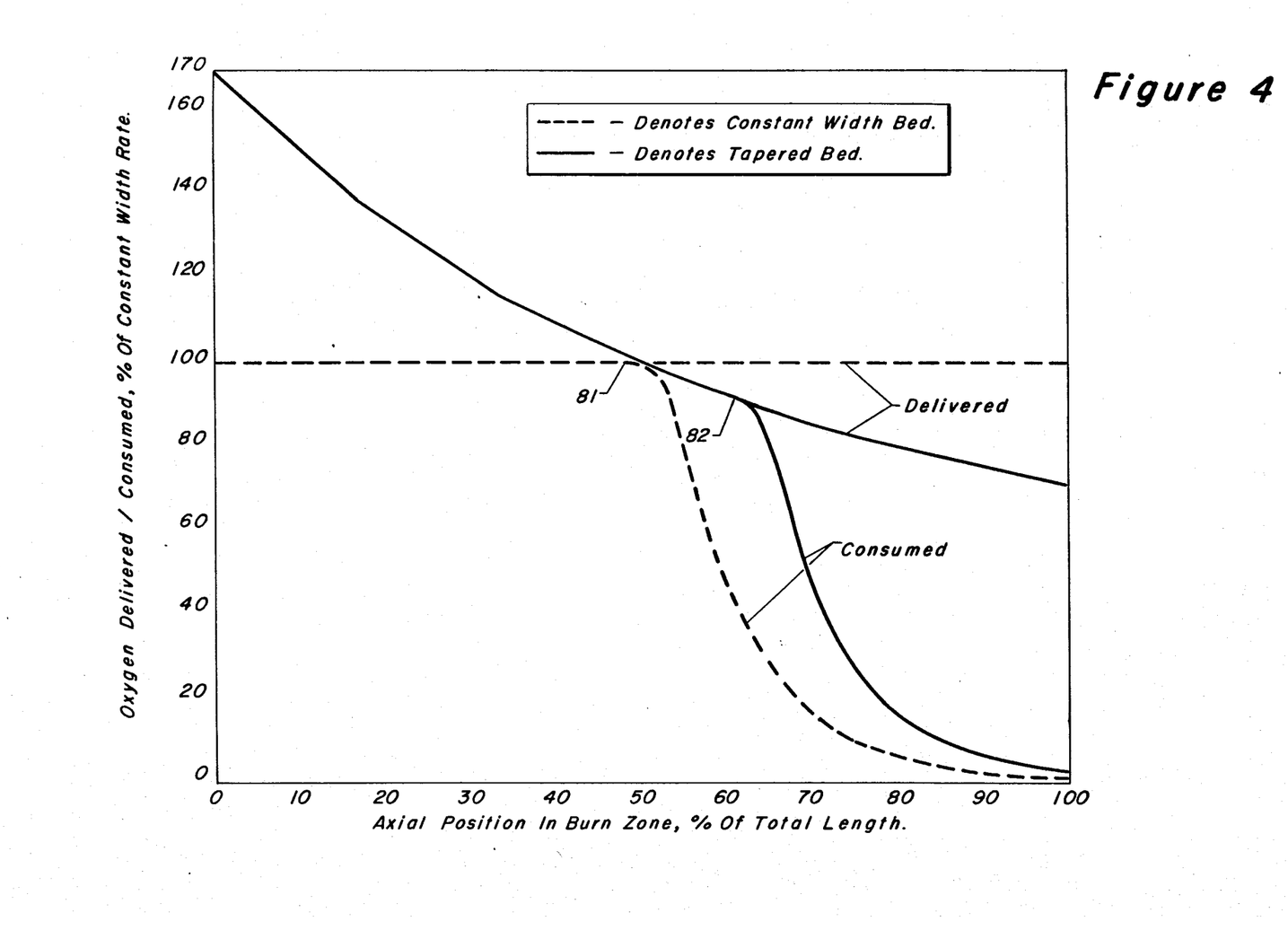
FIG. 4 is a graph showing oxygen delivery and consumption as a function of bed position.

The amount of oxygen delivered and consumed in both a constant-width bed and a tapered bed is shown by FIG. 4. The tapered bed is as depicted in FIG. 2 and the constant-width bed differs only in use of a constant bed thickness dimension. In the example from which FIG. 4 is drawn, the constant-width bed has a horizontal thickness of 6 inches (15.2 cm) and is annular in form, the catalyst being retained between a cylindrical inner screen and a cylindrical outer screen. The tapered bed has a thickness of 3 inches (7.6 cm) at the top of the bed and 9 inches (22.9 cm) at the lower boundary of the burn zone. The thickness of the bed is measured in a direction transverse to the direction of catalyst flow.

The rate of catalyst movement through a 6 inch (15.2 cm) constant-width bed or a tapered bed varying from a 3 inch (7.6 cm) thickness to a 9 inch (22.9 cm) thickness may range from as little as 200 pounds per hour (90.7 kg) to 1000 pounds per hour (453.6 kg) or more. Typical bed lengths for this range of catalyst flow rate are from about 4 feet (1.22 m) to about 20 feet (6.1 m). The diameter of the inner catalyst retention screen at the top will often be in excess of 36 inches (0.91 m), in order to accommodate a 36 inch flue gas pipe. Where larger catalyst movement rates are required, bed thickness may be increased. For example, for a 2000 pound per hour (907.2 kg) catalyst flow rate, a constant-width bed may be 9 inches (22.86 cm) thick and a tapered bed will vary from 4 to 5 inches (10.16–12.7 cm) thickness at the top to 12 to 14 inches (30.48–35.56 cm) thickness at the bottom. Bed length will be about 13 feet (5.15 m).

The amount of oxygen delivered to every point on the leading edge of the constant-width bed of FIG. 4 is the same; therefore plotting the rate of oxygen delivery versus the location of delivery along the length (vertical) of the bed yields the dashed horizontal line of FIG. 4. It is implicit in this plot that rate of delivery at any point around the circumference at the same axial position is the same. The total amount of oxygen delivered in a unit of time is also represented by the area under the horizontal dashed line extending from the top of the burn zone at the vertical axis to the bottom of the burn zone at the 100% location on the horizontal axis. The leading edge of the bed is the cylindrical exterior surface of the bed which is first contacted by recycle gas flowing to the bed. The gas flux at the leading edge, or flow rate of gas into the bed, is substantially the same at every point because the bed thickness is uniform, the pressure drop for gas flowing from the inlet nozzle to every point on the leading edge of the bed is small, compared to the pressure drop for gas flowing through the bed, and the pressure drop for gas flowing from every point on the downstream side of the bed to the outlet conduit is similarly small. That the thickness of the bed (6 inches, 15.2 cm) is uniform results in the gas flow across the bed being a constant; that is, for every gas path through the bed, the rate of gas flow is a constant.

All of the oxygen supplied to an upper region of the bed is consumed, since an abundant amount of coke is present. As catalyst particles move downward in the bed and coke is removed from them, a point is reached where less than all of the oxygen delivered is consumed. This is termed the breakthrough point and is shown by reference number 81 for the constant-width bed. Breakthrough occurs at a location spaced from the top of the bed by a distance of about 48.5% of the total length of the bed in the combustion section. It is known to those skilled in the art that catalyst particles of the type used in the hydrocarbon conversion processes of this invention have a large surface area, which results from the existence of a multiplicity of pores. When the catalyst particles reach the breakthrough point in the bed, the coke left on the surface of the particles is deep within the pores and therefore the oxidation reaction occurs at a much slower rate. This is illustrated by the portion of the curve (for oxygen consumed in the constant-width bed) to the right of the breakthrough point which rapidly falls off and then asymptotically approaches zero oxygen consumed. The amount of oxygen consumed after the breakthrough point is a fraction of that consumed in the bed above the breakthrough point. The vertical distance between the curve representing the amount delivered and the curve representing the amount consumed shows the amount of oxygen wasted at each position in the bed. It can be seen that a significant amount of the oxygen delivered to the bed is not consumed.

The coke content of catalyst exiting the bed is approximately 0.2% of the weight of the catalyst. Much of this residual coke is burned off in the halogenation zone or, if the halogenation zone is omitted, in the drying zone. Were catalyst leaving the combustion section to have on it a larger amount of coke, the temperature in the section below the combustion section would rise to an unacceptably high value, as a result of the heat of combustion.

Referring now to the tapered bed depicted in FIG. 2 and operationally represented by the curves of FIG. 4, gas flow through the bed is characterized as radial and transverse to the direction of movement of catalyst. Like the pressure loss for gas flow from inlet nozzle 31 through gas distribution space 17, the pressure drop for gas exiting the bed and flowing to outlet conduit 42 is low. Therefore the pressure drop across the bed at a particular bed elevation is a constant. There is no significant difference in pressure drop through coked catalyst as compared to fresh catalyst. The gas flow rate is related to the length of the flow path, through the bed which in the arrangement of FIG. 2 is the horizontal width, or the thickness of the bed. Thus, the gas flow rate decreases as bed width increases.

Since flow rate varies inversely with bed thickness, it can be seen that the amount of gas flowing through the tapered bed is at a maximum at the top of the bed and a minimum at the bottom of the bed. This is shown in FIG. 4 by the oxygen delivery curve for the tapered bed. Oxygen delivered at the very top of the bed is 170% of the amount delivered to a constant width bed. The amount of oxygen delivered decreases as the bed thickness increases, equalling the amount delivered to a constant width bed at about the 50% point, that is, about halfway down the bed from the top. There is no significance to the location of this crossover point being near the breakthrough point of the constant-width bed. At the bottom of the tapered bed, the oxygen delivered is about 72% of that delivered to a constant width bed.

Compared to the constant-width bed, the extent of the combustion reaction in the tapered bed is greater in the top portion of the tapered bed, since the amount of oxygen supplied is greater, and the reaction is limited by oxygen delivery at this point in the bed. In the lower portion of a tapered bed, the combustion reaction is less, since the amount of oxygen supplied is less. However, since combustion takes place at a much lower rate in the lower portion of the bed due to the low rate of oxygen diffusion into the innermost catalyst pores, the available oxygen is not a limiting factor.

Reference number 82 denotes the breakthrough point for the tapered bed. At that point, the oxygen consumed begins to diverge from the oxygen delivered. The oxygen breakthrough point is located much further down the length of the tapered bed than it is in the constant-width bed: about 62%, compared to 48.5%. The increased amount of oxygen used in the tapered bed and thus the increased amount of coke burned is easily seen by noting the difference in areas under the two curves for oxygen consumed. Also, the amount of oxygen supplied to the tapered bed but not used is represented by the area between the solid-line curves to the right of breakthrough point 82. That the amount of oxygen which passes unused through the constant-width bed is greater is illustrated by the curves for the tapered bed being contained totally within the dashed-line curves right of constant-width bed breakthrough point 81, the area between the dashed-line curves representing unused oxygen.

Figure 5:
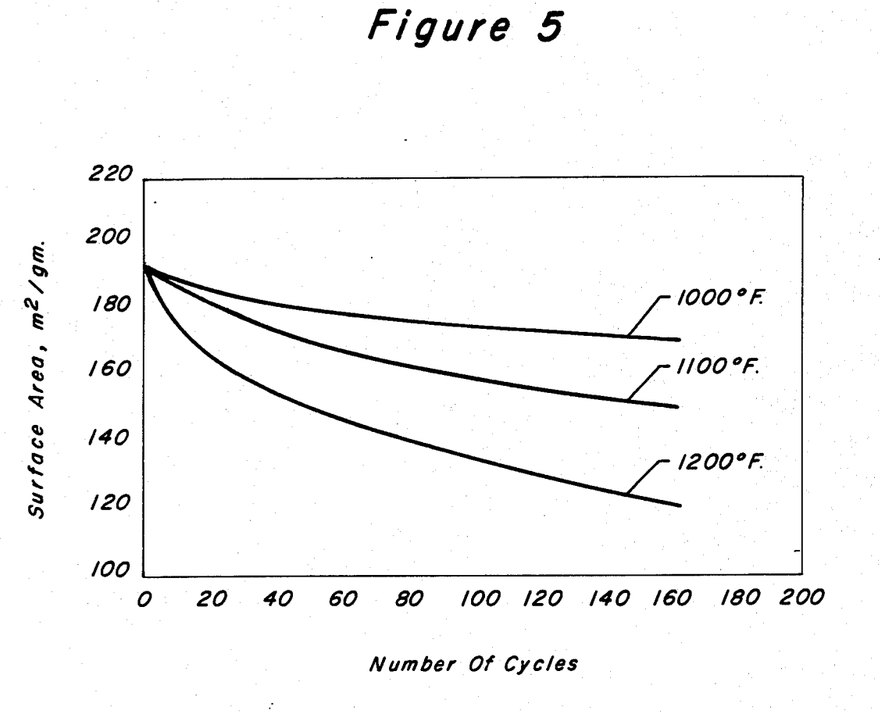
FIG. 5 is a graph showing the surface area loss on a catalyst as a function of regeneration cycles for a number of regeneration temperatures.

FIG. 5 depicts the results of experimental work in which changes in surface area of catalyst were studied. It is well known that the effectiveness of catalyst in promoting a hydrocarbon conversion reaction declines as surface area declines. A first batch of catalyst was subjected to numerous use and regeneration cycles. The peak catalyst temperature reached during each regeneration of this batch was 1000° F. (540° C.). It can be seen from FIG. 5 that the surface area of the catalyst declined as the number of use and regeneration cycles increased. A second batch of catalyst was processed in the same way, but the maximum catalyst temperature during each regeneration was 1100° F. (595° C.). A third batch was allowed to attain peak temperatures of 1200° F. (650° C.). It can be seen from FIG. 5 that the surface area of catalyst decreases upon exposure to hot gas and that the rate of decrease is related to length of exposure and gas temperature.

Figure 6:
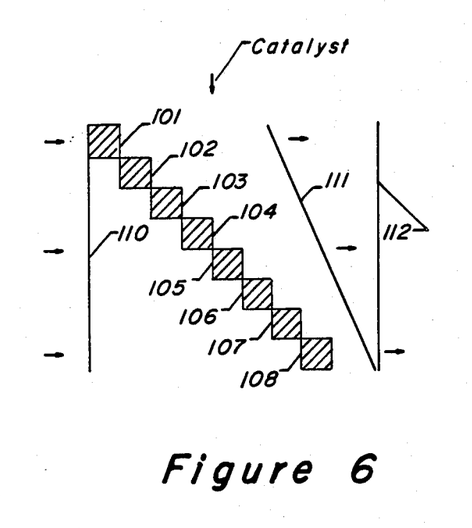
FIG. 6 is a schematic representation of a burn wave across a catalyst bed.

FIG. 6 is a schematic representation of the progression of a burn front through a portion of a catalyst bed. The drawing depicts a vertical section of the top portion of a moving bed of catalyst of the type depicted in FIG. 2. Catalyst is confined between outer screen 110 that provides an inlet face for the bed and tapered inner screen 111 that provides an outlet face for the bed. Line 112 represents an inner screen of a constant width bed. Gas flow through the catalyst is depicted by the horizontal arrows. The vertical arrow shows downward catalyst flow. The burn front is approximated by cells 101 through 108. The width and the height of each cell is shown in hatched cross-section. The tapers of the cells as well as the screen 111 are exaggerated to facilitate visualization.

The gas stream passes horizontally through the bed. The height of a cell is chosen arbitrarily to represent a discrete vertical unit down the bed. The width of each cell represents that portion of catalyst containing sufficient oxygen and coke to support vigorous combustion. In the idealized form of this representation, oxygen deficient gas, heated by combustion, continues its horizontal flow path from a cell until it reaches the outlet face of the bed. As the bed moves downward, substantially coke-free catalyst will leave the bottom of a given cell 101 and be replaced by spent catalyst that enters from the top of the cell. Gas that continuously enters the bed supplies the oxygen to combust coke as catalyst is replaced in a cell.

Consider now a horizontal slice of the bed containing cell 102. Catalyst located to the left of cell 102 has passed through cell 101 and therefore is free of coke. Gas entering the bed from the left of cell 102 cools the catalyst leaving cell 101 and provides oxygen to remove coke from the catalyst in cell 102. Oxygen-free gas at its peak temperature leaves cell 102 and passes through the catalyst to the right of cell 102. Each of the cells 103–108 have a progressively larger width of regenerated catalyst in the left of the cell and a progressively smaller width of coke-containing catalyst to the right of the cell. Therefore when the bed has a uniform width, catalyst that enters the bed at or near the outlet face is exposed to high temperature gas and moisture until it reaches the bottom of the burn front.

FIG. 6 illustrates that hot gas exposure time for catalyst behind, i.e., to the right of the burn front, is shorter in the tapered bed than in the constant-width bed. Looking at cell 101, hot gas flows through nearly twice the volume if it exits the bed at screen 112 (constant-width bed) rather than at screen 111 (tapered bed). Thus, the reduced high temperature exposure time lessens the surface area decline of the catalyst in a tapered bed versus that experienced for the catalyst in a constant-width bed.

Large benefits can be obtained from this invention with the use of a small taper behind the burn front. Catalyst that would be positioned against the outlet face of a constant-width bed experiences an extended exposure to high temperature gas. This exposure is also referred to as heat soak. Due to the extended heat soak caused by its position, catalyst moving closest to the outlet face experiences the most surface area decline. Therefore as the upper width of the catalyst is decreased, the volume of catalyst particles having the most susceptibility to surface area decline are removed first. As a result, a small taper, as little as 2° from the vertical, can greatly reduce the average heat soak time and surface area loss of the catalyst. In most operations, a taper in a range of from 2° to 10° is preferred. Of course, the taper angle will depend on its total length in the combustion zone.

Steeper taper angles are not usually desirable since not all of the coke on a differential volume of catalyst is burned off instantly. As previously mentioned, some coke is located deep within the pores of the catalyst particles such that it is not instantly contacted with a sufficient amount of oxygen for complete burning. The rate of combustion of the coke left on the catalyst located below the burn front of FIG. 6 is much slower and oxygen demands below the burn front can be as much as 5–10 times lower than the oxygen demands along the burn front. Therefore while, the maximum catalyst temperature is reached during the first stage of coke burning along the burn front, it is still necessary to have sufficient oxygen-containing gas contact the catalyst below the burn front. For this reason, the maximum thickness of the catalyst bed below the burn front will not normally exceed three times the minimum bed thickness in the area of the burn front.

As mentioned above, catalyst temperatures which are commonly employed vary widely. A typical catalyst temperature at the top of the burn zone is about 890° F. (475° C.). It might rise to a peak of about 1100° F. (595° C.) and start falling at the breakthrough point to a temperature in the range of about 900–1000° F. (480–540° C.). The thickness of the catalyst bed, characteristics of the catalyst particles, and gas flow rate are factors that determine the pressure drop for a gas flow path through a particular bed. Practice of the present invention is not dependent upon any particular numerical values. Average superficial gas velocities across the bed will typically be in a range of 1.0 to 3.5 ft/sec. Maximum gas velocities are limited by catalyst pinning which holds the catalyst against the outlet screen and prevents downward catalyst movement. Variations in bed thickness will vary the superficial velocity between upper and lower portions of the combustion zone by 150 to 250%. Commonly used pressure drops may range from 0.5 to 10 psi (3.4 to 68.9 kPa).

Figure 9:
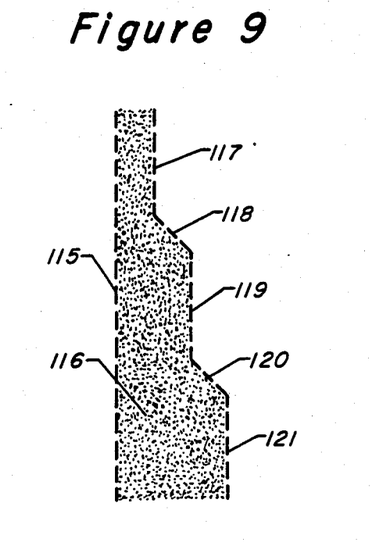
FIG. 9 is a cross-section of another catalyst bed arrangement for use in the method of this invention.

In addition, practice of this invention does not required confinement of the catalyst particles in a smooth taper. Catalyst retention screens may be fabricated such that bed thickness increases in a stepwise manner. FIG. 9 illustrates the cross-section of a stepped bed configuration. Screen 115 can represent an outer or inner catalyst retention screen and screen sections 117, 199, and 121, can represent the other of the inner or outer catalyst retention screens. Screen sections 117, 119, and 121 are spaced apart from screen 115 at progressively increasing distances to vary the thickness of a catalyst bed 116 located between the screen sections. Angled screen elements 118 and 120 provide transitions between vertical sections 117 and 119, and 119 and 121. The sections in FIG. 9 can extend horizontally in a straight line to provide flat bed surfaces or may curve to give the bed surfaces cylindrical or elliptical profiles.

What is claimed is:

1. A method of removing coke from the surface of solid catalyst particles in a regeneration zone through which the particles move in at least semi-continuous flow, aid method comprising:

(a) passing catalyst particles containing coke deposits into said regeneration zone;

(b) forming a vertically elongated bed of said particles in a combustion section of said regeneration zone;

(c) at least periodically moving said particles down said bed;

(d) introducing an oxygen-containing gas into said combustion section in an amount sufficient to provide breakthrough of said oxygen-containing gas, passing said gas into an inlet face of said bed in a direction generally transverse to the direction of catalyst flow so that the oxygen-containing gas passes through the upper portion of said combustion section at a superficial velocity that is greater than the superficial velocity of the gas passing through a lower portion of the combustion section, and initiating combustion of said coke deposits along a burn front that extends vertically through said combustion section, said front having a width less than the width of said bed, said burn front starting at the uppermost point of said inlet face and extending down said catalyst bed at an angle such that the distance from said inlet face to said burn increases with its distance from said uppermost point;

(e) collecting a flue gas, produced by combustion of said coke, from an outlet face of said bed, and removing said flue gas from said regeneration zone;

(f) decreasing the duration of travel of said flue gas in at least an upper portion of said combustion section after said flue gas exits said burn front; and (g) withdrawing particles from the bottom of said bed below a point in said combustion section at which breakthrough of said oxygen-containing gas occurs, and adding catalyst particles to the top of said bed thereby causing said moving of said particles.

2. The method of claim 1 wherein the volume of said bed is restricted to reduce the volume of catalyst in contact with said flue gas by confining said bed to have a smaller thickness at the top of said combustion section than the thickness of said bed at the bottom of said combustion section.

3. The method of claim 1 wherein said bed is confined to have a uniform taper over the length of said combustion zone.

4. The method of claim 1 wherein said particles are passed from said combustion section into a halogenation section of said regeneration zone and said vertically elongated bed of particles is formed to extend into said halogenation zone.

5. The method of claim 1 wherein said catalyst particles are passed through said regeneration zone at a rate that retains said particles in said combustion section until said burn front contacts said outlet face.

6. The method of claim 5 wherein oxygen-containing gas is passed through a portion of said catalyst particles below the lowermost end of said burn front.

7. The method of claim 4 wherein a drying gas is passed into a drying section of said regeneration zone and catalyst particles are passed into said drying section from said halogenation section.

8. The method of claim 7 wherein said drying gas comprises dry air and at least a portion of said drying gas is passed upwardly from said drying zone into said bed through said halogenation section, and into said combustion section.

9. The method of claim 1 wherein said catalyst particles are confined to provide a tapered surface having an angle in the range of from 2 to 10 from the vertical.

10. The method of claim 1 wherein said oxygen-containing gas passes through said bed at an average superficial velocity in a range of from 1.0 to 3.5 ft/sec.

11. The method of claim 1 wherein said oxygen-containing gas passes through an upper portion of said combustion section at a superficial velocity that is at least 150% higher than the superficial velocity of said oxygen-containing gas passing through a lower portion of said combustion section.

12. The method of claim 1 wherein said catalyst particles are transferred from, and returned to, a catalytic reforming process.

13. A method of removing coke from catalyst particles in a regeneration zone containing a vertically extended and continuous combustion section through which the particles move in at least semi-continuous flow, said method comprising:
  (a) passing catalyst particles containing coke deposits into said regeneration zone;
  (b) forming a vertically elongated bed of said particles in said combustion section of said regeneration zone;
  (c) at least periodically moving said particles down said bed by withdrawing particles from the bottom of said bed and adding catalyst particles to the top of said bed;
  (d) introducing an oxygen-containing gas into said combustion section, by passing all of said gas into a distribution space that communicates with an inlet face of said bed, said distribution space providing open communication for said gas with said inlet face over the length of said combustion section, passing said gas through said bed in a direction generally transverse to the direction of catalyst flow, at a differential flow rate that is greatest at an upper portion of said combustion section and lowest in a lower portion of said combustion section, and initiating combustion of said coke deposits along a burn front that extends vertically through said combustion section, said front having a width less than the width of said bed, said burn front starting at the uppermost point of said inlet face and extending down said catalyst bed at an angle such that the distance from said inlet face to said burn front increases with its distance from said uppermost point and said continuous combustion section having sufficient length for breakthrough of said oxygen-containing gas to occur within said combustion section;
  (e) collecting a flue gas, produced by combustion of said coke, from an outlet face of said bed, and removing said flue gas from said regeneration zone; and
  (f) reducing the volume of said particles between said burn front and said outlet face by confining said bed to have a smaller thickness at the top of said combustion section than the thickness of said bed at the bottom of said combustion section.

14. The method of claim 13 wherein said catalyst particles are passed through said regeneration zone at a rate that retains said particles in said combustion section until said burn front contacts said outlet face.

15. The method of claim 14 wherein oxygen-containing gas is passed through a portion of said catalyst particles below the lowermost end of said burn front and particles withdrawn from said bed have a coke content that does not exceed 0.2 wt. % of the particles.

16. The method of claim 15 wherein said particles are passed from said combustion section into a halogenation section of said regeneration zone and said vertically elongated bed of particles is formed to extend into said halogenation zone.

17. The method of claim 16 wherein said bed is confined to have a uniform taper over the length of said combustion zone.

18. The method of claim 17 wherein a drying gas is passed into a drying section of said regeneration zone and catalyst particles are passed into said drying section from said halogenation section.

19. The method of claim 18 wherein said drying gas comprises dry air and at least a portion of said drying gas is passed upwardly from said drying zone into said bed, through said halogenation section, and into said combustion section.

20. The method of claim 19 wherein said catalyst particles are transferred from, and returned to, a catalytic reforming process.

* * * * *

UNITED STATES PATENT AND TRADEMARK OFFICE
CERTIFICATE OF CORRECTION

PATENT NO. : 4,859,643

DATED : August 22, 1989

INVENTOR(S) : Sechrist et al

It is certified that error appears in the above-identified patent and that said Letters Patent is hereby corrected as shown below:

Column 14, line 58, after "burn," insert --front--.

Signed and Sealed this

Ninth Day of October, 1990

*Attest:*

HARRY F. MANBECK, JR.

*Attesting Officer*  *Commissioner of Patents and Trademarks*